United States Patent
Rhee et al.

(10) Patent No.: US 9,443,343 B2
(45) Date of Patent: Sep. 13, 2016

(54) METHOD AND APPARATUS FOR REALISTICALLY REPRODUCING EYEBALL

(75) Inventors: Tae Hyun Rhee, Yongin-si (KR); Seon Min Rhee, Seoul (KR); Hyun Jung Shim, Seoul (KR); Do Kyoon Kim, Seongnam-si (KR); Abhijeet Ghosh, Playa Del Rey, CA (US); Jay Busch, Lawndale, CA (US); Jen-Yuan Chiang, Pasadena, CA (US); Paul Debevec, Marina Del Rey, CA (US)

(73) Assignees: Samsung Electronics Co., Ltd., Suwon-si (KR); University of Southern California, Los Angeles, CA (US)

( * ) Notice: Subject to any disclaimer, the term of this patent is extended or adjusted under 35 U.S.C. 154(b) by 748 days.

(21) Appl. No.: 13/303,273

(22) Filed: Nov. 23, 2011

(65) Prior Publication Data

US 2012/0188228 A1  Jul. 26, 2012

Related U.S. Application Data

(60) Provisional application No. 61/416,906, filed on Nov. 24, 2010.

(30) Foreign Application Priority Data

Dec. 13, 2010  (KR) .................. 10-2010-0127123

(51) Int. Cl.
*G06T 15/04*  (2011.01)
*G06T 15/80*  (2011.01)
*G06T 13/40*  (2011.01)

(52) U.S. Cl.
CPC ............. *G06T 15/04* (2013.01); *G06T 13/40* (2013.01); *G06T 15/80* (2013.01)

(58) Field of Classification Search
None
See application file for complete search history.

(56) References Cited

U.S. PATENT DOCUMENTS

| | | | | |
|---|---|---|---|---|
| 2006/0167670 | A1* | 7/2006 | Deering | 703/11 |
| 2009/0271155 | A1* | 10/2009 | Dupps et al. | 703/1 |
| 2010/0256965 | A1* | 10/2010 | Rathjen | 703/11 |

FOREIGN PATENT DOCUMENTS

| | | |
|---|---|---|
| JP | 2008-090792 | 4/2008 |
| KR | 10-2005-0022306 | 3/2005 |
| KR | 10-2006-0007537 | 1/2006 |
| KR | 10-2006-0096612 | 9/2006 |

OTHER PUBLICATIONS

Guillaume Francois, Pascal Gautron, Gaspard Breton and Kadi Bouatouch; "Image-Based Modeling of the Human Eye" IEEE Transactions on Visualization and Computer Graphics, vol. 15, No. 5, Sep./Oct. 2009; pp. 815-827; published online Jan. 26, 2009.*
Vitor F. Pamplona and Manuel M. Oliveira; "Photorealistic Models for Pupil Light Reflex and Iridal Pattern Deformation;" ACM Transactions on Graphics, vol. 28, No. 4, Article 106, pp. 106.1-106.12; Publication date: Aug. 2009.*

(Continued)

*Primary Examiner* — Edward Martello
(74) *Attorney, Agent, or Firm* — NSIP Law (57) ABSTRACT

Provided is a method and apparatus for realistically reproducing an eyeball that may verify and analyze a material property and a deformation property with respect to each of constituent portions of an eyeball and may render each of the constituent portions based on the analyzed priorities, thereby more realistically reproducing the eyeball.

23 Claims, 10 Drawing Sheets

(56) References Cited

OTHER PUBLICATIONS

Mark A. Sagar et al.; "A Virtual Environment and Model of the Eye for Surgical Simulation;" ACM SIGGRAPH '94, Jul. 24-29, 1994, Orlando, Florida; 8 pages.*

Francois et al. ("Subsurface Texture Mapping;" Published by the IEEE Computer Society; Jan./Feb. 2008; pp. 34-42.*

Thomas et al. ("A New Approach for Sclera Vein Recognition;" Mobile Multimedia/Image Processing, Security, and Applications 2010, edited by Sos S. Agaian, Sabah A. Jassim, Proc. of SPIE vol. 7708, 770805; May 2010, 10 pages.*

* cited by examiner

DECREASED PUPIL SIZE    INCREASED PUPIL SIZE    INCREASED PUPIL SIZE

CORNEA BEFORE REPRODUCING REFRACTION OF CAMERA RAY

CORNEA AFTER REPRODUCING REFRACTION OF CAMERA RAY

FIG. 12

MULTI-VIEW SCLERA IMAGES

FIG. 13

SCLERA MAP BASED ON COMBINING/STITCHING OF IMAGES S1 - S4

METHOD AND APPARATUS FOR REALISTICALLY REPRODUCING EYEBALL

CROSS-REFERENCE TO RELATED APPLICATIONS

This application claims the priority benefit of 35 U.S.C. §119(a) of U.S. Provisional Application No. 61/416,906, filed on Nov. 24, 2010, in the U.S. Patent and Trade Mark Office, and Korean Patent Application No. 10-2010-0127123, filed on Dec. 13, 2010, in the Korean Intellectual Property Office, the disclosures of which are incorporated herein by reference.

BACKGROUND

1. Field

One or more example embodiments of the present disclosure relate to a method and apparatus for realistically reproducing an eyeball.

2. Description of the Related Art

Realistic human modeling and animation may refer to major technologies used for a movie production using computer graphics (CG), a game, a medical simulation, and the like. More realistic reproduction with respect to a face of a human being is becoming a major issue.

In particular, eyes of the face may maximally show first impression or feelings about the corresponding human being. Accordingly, how realistically eyes are reproduced may significantly affect a sensory reproduction with respect to the face. In general, the accuracy of geometry with respect to a face, a texture reproduction, and the like may be used for realistic facial modeling. When eyes are not realistically reproduced, the general sense of reality with respect to a face may also be deteriorated. Accordingly, there is a desire for a modeling and rendering method that may more realistically reproduce eyeballs.

SUMMARY

The foregoing and/or other aspects are achieved by providing a method of realistically reproducing an eyeball, including: modeling, to a planar eyeball image, the eyeball including a cornea, a sclera, and an iris; identifying, from the eyeball image, portions corresponding to the cornea, the sclera, the iris, a pupil, a conjunctiva, and a tear film of the eyeball; and rendering each of the portions of the eyeball based on a material property and a deformation property with respect to each of the portions of the eyeball.

The rendering may include: restoring a texture and a tone constant with respect to the iris; and optically rendering the iris by employing a multi-layer structure using the texture and the tone constant with respect to the iris.

The rendering may include deforming a shape of the pupil based on a position of light entering the pupil, a direction of the light, and an amount of the light.

The deforming may include deforming a size of the pupil based on a difference between a normal vector with respect to a surface of the pupil and an incident angle of the light on the surface of the pupil.

The deforming may include reducing the size of the pupil when the difference between the normal vector with respect to the surface of the pupil and the incident angle of the light on the surface of the pupil is relatively small, and enlarging the size of the pupil when the difference between the normal vector with respect to the surface of the pupil and the incident angle of the light on the surface of the pupil is relatively great.

The rendering may include rendering the cornea by applying a refractive index of a camera ray and a refractive index of a light ray with respect to the cornea.

The rendering may include generating a sclera map with respect to a sclera of a target object desired to be reproduced, using multi-view images with respect to the sclera of the target object.

The generating may include: capturing the multi-view images with respect to the sclera of the target object; and generating the sclera map by stitching the captured multi-view images.

The rendering may include reproducing the conjunctiva based on minute blood vessels reproduced on the corneal map, information associated with minute wrinkles within the conjunctiva, and a noise pattern.

The rendering may include reproducing the tear film based on a thickness of the tear film and a specular reflectivity of the sclera.

The foregoing and/or other aspects are achieved by providing an apparatus for realistically reproducing an eyeball, including: a modeling module to model, to a planar eyeball image, the eyeball including a cornea, a sclera, and an iris; an identification module to identify, from the eyeball image, portions corresponding to the cornea, the sclera, the iris, a pupil, a conjunctiva, and a tear film of the eyeball; and a rendering module to render each of the portions of the eyeball based on a material property and a deformation property with respect to each of the portions of the eyeball.

The rendering module may include an iris rendering module to restore a texture and a tone constant with respect to the iris, and to optically render the iris by employing a multi-layer structure using the texture and the tone constant with respect to the iris.

The rendering module may include a pupil deformation unit to deform a shape of the pupil based on a position of light entering the pupil, a direction of the light, and an amount of the light.

The rendering module may include a cornea rendering unit to render the cornea by applying a refractive index of a camera ray and a refractive index of a light ray with respect to the cornea.

The rendering unit may include a sclera rendering unit to generate a sclera map with respect to a sclera of a target object desired to be reproduced, using multi-view images with respect to the sclera of the target object.

The rendering unit may include a conjunctiva rendering unit to reproduce the conjunctiva based on minute blood vessels reproduced on the corneal map, information associated with minute wrinkles within the conjunctiva, and a noise pattern.

The rendering module may include a tear film rendering unit to express the tear film based on a thickness of the tear film and a specular reflectivity of the sclera.

According to the example embodiments, a material property and a deformation property may be verified and analyzed for each of constituent portions of an eyeball, and the eyeball may be individually modeled and rendered separate from a face. Accordingly, it is possible to increase degrees of freedom with respect to a motion or an reproduction of the eyeball, and to effectively express a minute motion, a tremble, and the like of the eyeball.

According to the example embodiments, eyeball rendering tailored for each person is enabled and thus, may be applicable to an avatar creation for each user, a game, an entertainment application, and the like.

The foregoing and/or other aspects are achieved by providing a method of rendering an eyeball in which each individual component of the eyeball is separately rendered by way of a processor in accordance with unique properties of the individual component.

The foregoing and/or other aspects are achieved by providing an apparatus for reproducing an eyeball. The apparatus includes a processor to control one or more processor-executable modules, an identification module to identify individual components of the eyeball, and a rendering module to render each individual component of the eyeball separately in accordance with unique properties of the individual component.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Figure 1:
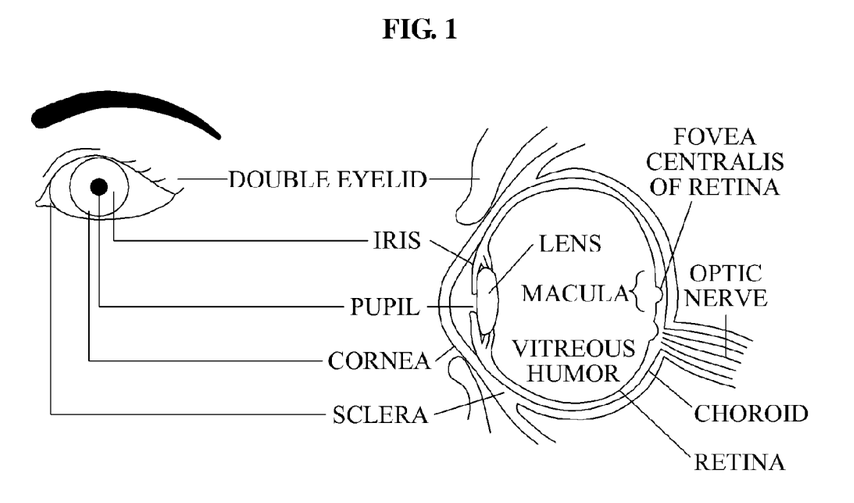
FIG. 1 illustrates a structure of an eyeball used for example embodiments.
Figure 2:
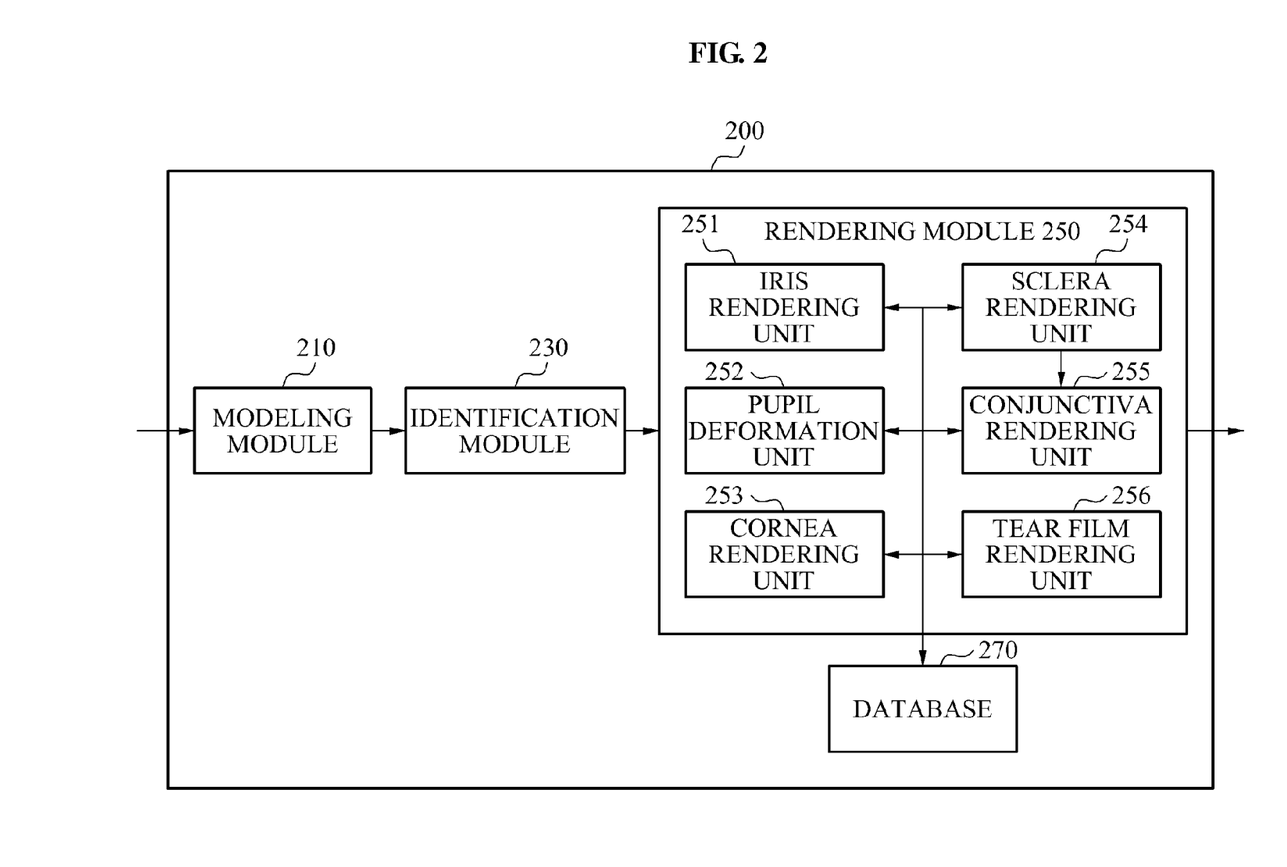
FIG. 2 illustrates an apparatus for realistically reproducing an eyeball according to example embodiments.

FIG. 1 illustrates a structure of an eyeball used for example embodiments, and FIG. 2 illustrates an apparatus for realistically reproducing an eyeball according to example embodiments.

Referring to FIG. 1 and FIG. 2, the eyeball may include various constituent portions, for example, an iris, a pupil, a cornea, a sclera, a conjunctiva, a tear film, and the like. Each of the constituent portions of the eyeball may have a different material property and a deformation property. Accordingly, for realistic eyeball rendering, an image of the eyeball may be modeled and then, a property with respect to of each of the constituent portions may be used for rendering.

The eyeball may have a volume of about 6.5 cc, and have a specific gravity of 1.077. A normal intraocular pressure may be about 10 mmHg to about 12 mmHg. The eyeball may form an image on a retina by refracting a visible ray of 380 mm to 750 mm.

Among the constituent portions of the eyeball, the cornea functions to protect the eyeball and enables a ray to be refracted and thereby reach the retina. The cornea is connected to the sclera in a corneal limbus. A refractive index of the cornea may be 43D, and a diameter of the cornea may be 11.4 mm by width and 10.8 mm by length. A central portion of the cornea may have a thickness of 0.5 mm and a spherical portion of the cornea may have a thickness of 0.7 mm.

A vertical curvature of the cornea may be slightly greater than a horizontal curvature of the cornea, and the cornea may have '+' refractive index (front surface +48.83 and rear surface −5.88).

The sclera may occupy ⅚ of a rear portion of the eyeball. The sclera includes tight fibrous tissues and is white and hard. In the sclera, a thickness of a thin portion, for example, a taproot attachment portion is about 0.3 mm and a thickness of a thick portion, for example, a portion around the optic nerve is about 1 mm. Compared to the cornea, which is typically in a dry state, a moisture content of the sclera is 65% to 70% and thus appears opaque or white.

The iris includes the pupil in the center, and includes multiple layers, for example, an anterior boarder layer (ABL), a stroma, and an iris pigment epithelium (IPE).

The ABL corresponds to a discontinuous layer configured by tela connective and melanin of the stroma tightly concentrated. The stroma includes fibroblast, pigment cell, and collagenous fiber. Blood vessels are generally distributed in the stroma. The IPE includes a double-bed structure and includes melanin. The iris may be reduced or expanded by a sphincter muscle of the pupil that reduces the pupil by way of a parasympathetic nerve and dilator muscle of the pupil that expands the pupil by way of a sympathetic nerve.

The pupil functions as a diaphragm to adjust an amount of light entering the eyeball.

The conjunctiva corresponds to a thin and transparent mucous membrane, and includes a palpebral conjunctiva closely attached to a rear surface of tarsal plates, a bulbar conjunctiva covering an inner sclera of the eyeball, and a fornix conjunctiva connecting the palpebral conjunctiva and the bulbar conjunctiva.

The tear film describes a layer positioned at an outermost portion of the eyeball, and more accurately, corresponds to a film formed by tears generated in a lacrimal apparate and regularly secreted on the surface of the sclera. The tear film supplies nutrition to corneal epithelium through a pumping operation of tears via an eyelid, and functions as a lubricant.

Referring to FIG. 2, the realistically eyeball reproducing apparatus may include a modeling module 210, an identification module 230, and a rendering module 250. The realistically eyeball reproducing apparatus may further include a database 270.

The modeling module 210 may model, to a planar eyeball image, the eyeball including a cornea, a sclera, and an iris. A method of the modeling module 210 modeling the eyeball to the eyeball image will be described with reference to FIG. 3.

The identification module 230 may identify, from the eyeball image, portions corresponding to the cornea, the sclera, the iris, a pupil, a conjunctiva, and a tear film of the eyeball.

The rendering module 250 may render each of the portions of the eyeball based on a material property or a deformation property or both with respect to each portion of the eyeball. For example, in an embodiment, the rendering module 250 renders each individual component of the eyeball separately according to a property of the individual component, such as a material property or a deformation property.

To render or deform each of the portions of the eyeball, the rendering module 250 may include an iris rendering unit 251, a pupil deformation unit 252, a cornea rendering unit 253, a sclera rendering unit 254, a conjunctiva rendering unit 255, and a tear film rendering unit 256. A collective rendering result using a property for each constituent portion of the eyeball by the rendering module 250 will be described with reference to FIG. 5.

The iris rendering module 251 may restore a texture and a tone constant with respect to the iris, and optically render the iris by employing a multi-layer structure using the texture and the tone constant with respect to the iris. A method of the iris rendering unit 251 rendering the iris using the multi-layer structure will be described with reference to FIG. 6.

The pupil deformation unit 252 may deform a shape of the pupil based on a position of light entering the pupil, a direction of the light, and an amount of the light. The pupil deformation unit 252 may deform a size of the pupil based on a difference between a normal vector with respect to a surface of the pupil and an incident angle of the light on the surface of the pupil. A method of the pupil deformation unit 252 deforming the pupil will be described with reference to FIG. 7.

The cornea rendering unit 253 may render the cornea by applying a refractive index of a camera ray and a refractive index of a light ray with respect to the cornea. The refractive index of the camera ray and the refractive index of the light ray with respect to the cornea may be different from each other. Accordingly, the cornea before and after using refractive indices of corresponding rays may be differently reproduced, which will be described with reference to FIG. 8 through FIG. 11.

The sclera rendering unit 254 may generate a sclera map with respect to the sclera of a target object desired to be reproduced, using multi-view images with respect to the sclera of the target object. A method of the sclera rendering unit 254 generating the sclera map using the multi-view images will be described with reference to FIG. 12 and FIG. 13.

The conjunctiva rendering unit 255 may reproduce the conjunctiva using minute blood vessels reproduced on the corneal map, information associated with minute wrinkles within the conjunctiva, and a noise pattern. The minute blood vessels reproduced on the corneal map may correspond to minute blood vessels reproduced on the map that is generated from the multi-view images by the sclera rendering unit 254. Information associated with the minute wrinkles within the conjunctiva may be obtained from the target object using a fluorescent material and the like, or may be other medical information. The aforementioned information and the noise pattern may be received from the database 270. The conjunctiva rendering unit 255 may include an apparatus for generating the above noise pattern.

A method of the conjunctiva rendering unit 255 reproducing the wrinkles within the conjunctiva will be described with reference to FIG. 14.

The tear film rendering unit 256 may reproduce the tear film based on a thickness of the tear film and a specular reflectivity of the sclera. The tear film may affect blinking of an eye. Accordingly, the tear film rendering unit 256 may reproduce a blinking eye by increasing the specular reflectivity of the sclera, or may reproduce a sleepy or vague looking eye by decreasing the specular reflectivity of the sclera. When the tear film becomes thick, refraction may occur due to the tear film. Accordingly, the tear film rendering unit 256 may reproduce the tear film based on a thickness of the tear film.

The database 270 may store data used for the rendering module 250, and data generated by the rendering module 250. For example, the database 270 may include information associated with the sclera map used for the conjunctiva rendering unit 255, minute wrinkles within the conjunctiva, and the like.

Figure 3:
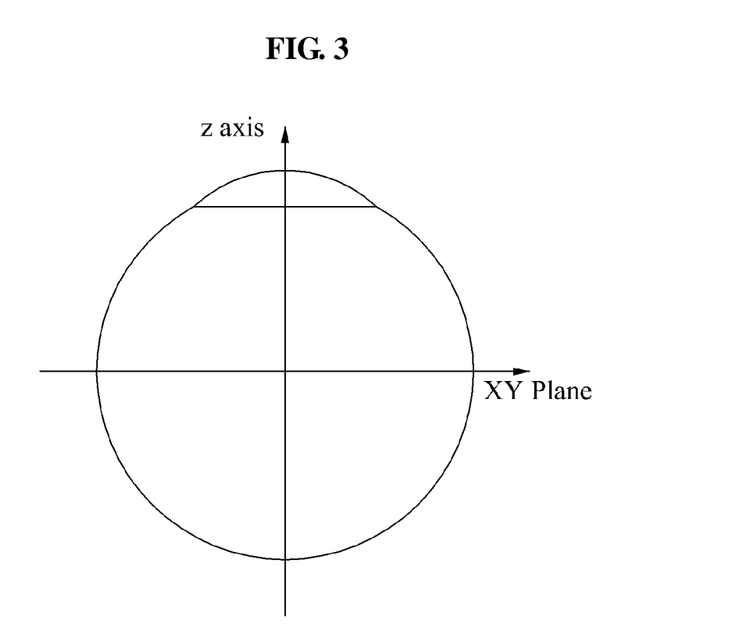
FIG. 3 illustrates a modeling result with respect to a shape of an eyeball according to example embodiments.

FIG. 3 illustrates a modeling result with respect to a shape of an eyeball according to example embodiments. Referring to FIG. 3, the shape of the eyeball may be reproduced in a form that two spheres are overlapped in a portion where an iris is reproduced. The shape of the eyeball may be modeled using a variety of techniques.

Modeling of the shape of the eyeball may be differently reproduced based on a desired size. For example, the pupil, the cornea, and the iris may be reproduced according to Equation 1 through Equation 3.

$$\text{Pupil: } 0.75z^*z + 12.3536z + -30.2501 + x^*x + y^*y = 0 \quad \text{[Equation 1]}$$

$$\text{Cornea: } z^*z + x^*x + y^*x = 1.489 \quad \text{[Equation 2]}$$

$$\text{Position of iris: } z = 1.05 \quad \text{[Equation 3]}$$

Figure 4:
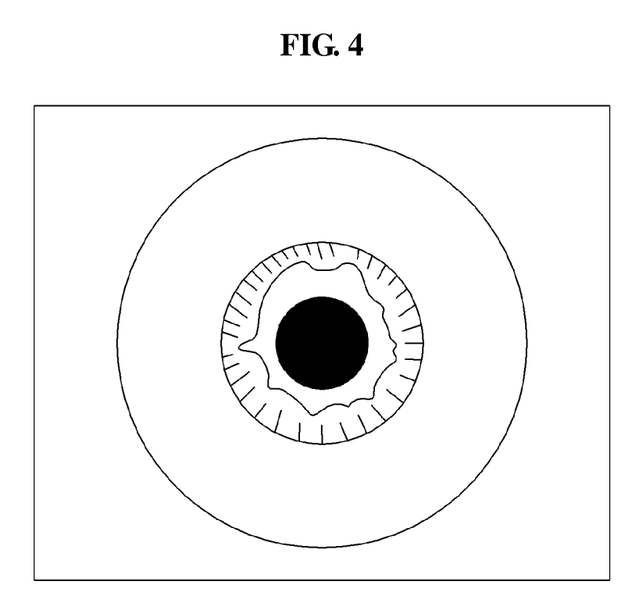
FIG. 4 illustrates a simple rendering result with respect to the whole eyeball using the same algorithm with the assumption that the eyeball has a single texture.
Figure 5:
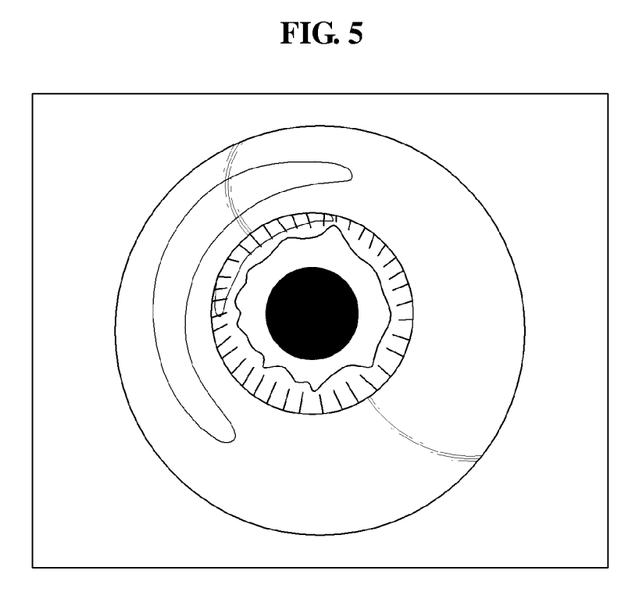
FIG. 5 illustrates a rendering result using an apparatus for realistically reproducing an eyeball according to example embodiments.

FIG. 4 illustrates a simple rendering result with respect to the whole eyeball using the same algorithm with the assumption that the eyeball has a single material, and FIG. 5 illustrates a rendering result using an apparatus for realistically reproducing an eyeball according to example embodiments.

Referring to FIG. 5, the eyeball may be more three dimensionally and accurately reproduced by collectively rendering the modeled eyeball using a material property and a deformation property with respect to each of constituent portions of the eyeball. For example, in an embodiment, each eye component such as a sclera, an iris, a cornea, etc. is individually rendered according to a property of the respective individual component.

Figure 6:
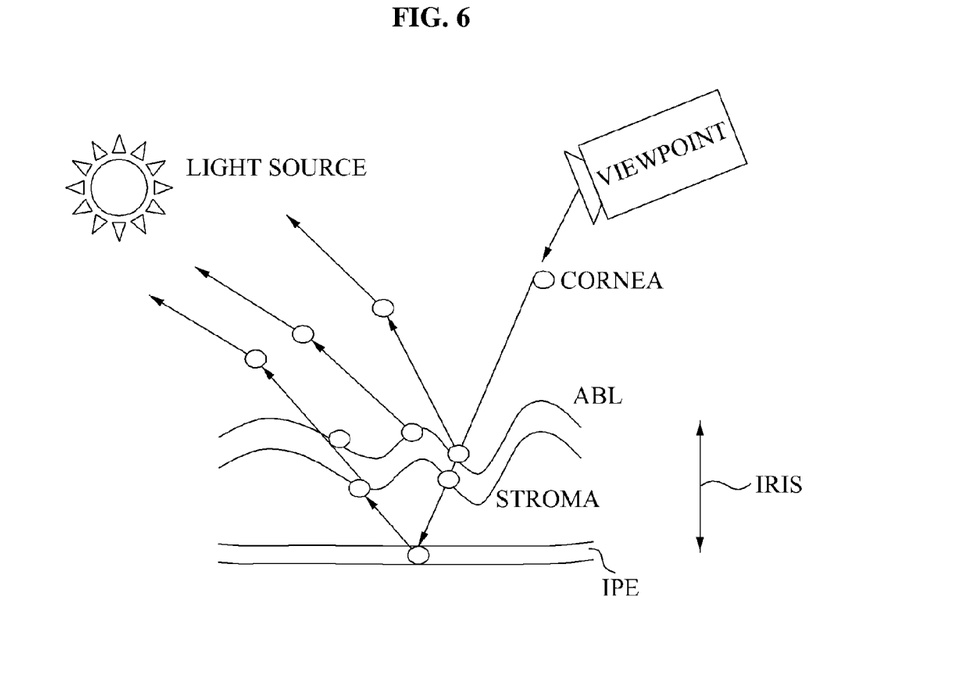
FIG. 6 illustrates a diagram to describe an iris including multiple layers according to example embodiments.

FIG. 6 illustrates a diagram to describe an iris including multiple layers according to example embodiments.

Referring to FIG. 6, the iris rendering unit 251 may configure the iris using a multi-layer structure. The iris rendering unit 251 may restore a texture of the iris by performing un-refraction with respect to a refraction-applied image, and may restore a tone constant, for example, a constant of melanin. As described above with reference to FIG. 1, the iris may have a multi-layer structure including an ABL, a stroma, and an IPE. Accordingly, the iris rendering unit 251 may configure the multi-layer structure of the iris including the ABL, the stroma, and the IPE by applying the texture and the tone constant of the iris. The iris rendering unit 251 may optically render the iris using the multi-layer structure of the iris.

Figure 7:
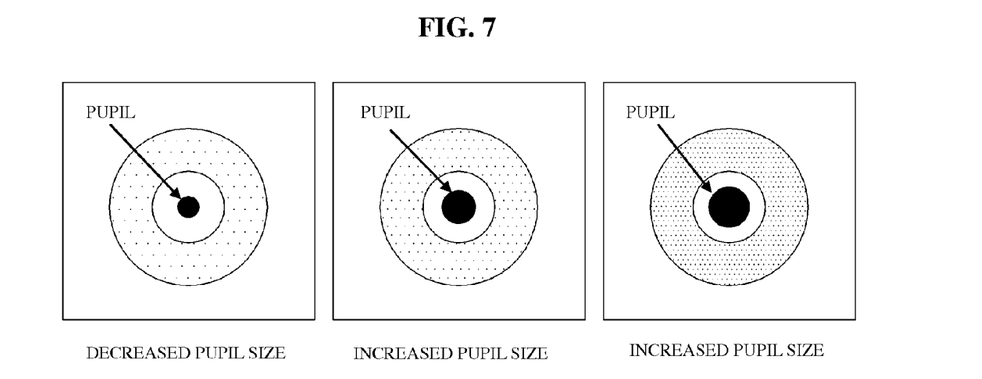
FIG. 7 illustrates images to describe a deformation property of a pupil according to example embodiments.

FIG. 7 illustrates images to describe a deformation property of a pupil according to example embodiments.

Referring to FIG. 7, the pupil may be deformed depending on a position of light, a direction of light, and an amount of light. In particular, as shown in a left image of FIG. 7, a size of the pupil may decrease to adjust an amount of light to be transferred to a retina. As shown in an intermediate image and a right image of FIG. 7, the size of the pupil may increase as surroundings become darker.

The pupil deformation unit 252 may enhance a sensory effect by deforming the pupil based on the deformation property of the pupil being deformed by the light. The pupil deformation unit 252 may adjust the size of the pupil based on a difference between a normal vector with respect to a surface of the pupil and an incident angle of an illumination or light on the surface of the pupil. For example, the pupil deformation unit 252 may deform the pupil by reducing the size of the pupil when the difference between the normal vector with respect to the surface of the pupil and the incidence angle of light is relatively small, and by enlarging the size of the pupil when the difference between the normal vector with respect to the surface of the pupil and the incidence angle of light is relatively great.

Since the pupil deformation unit 252 may deform the size of the pupil as described above, general feelings and images in a dark place and a bright place may be more accurately reproduced with respect to an avatar having the same facial appearance. In addition, the pupil deformation unit 252 may reproduce changes according to a position of light or a direction of light by reproducing a portion reflected to the pupil differently depending on the position of light or the direction of light.

Figure 8:
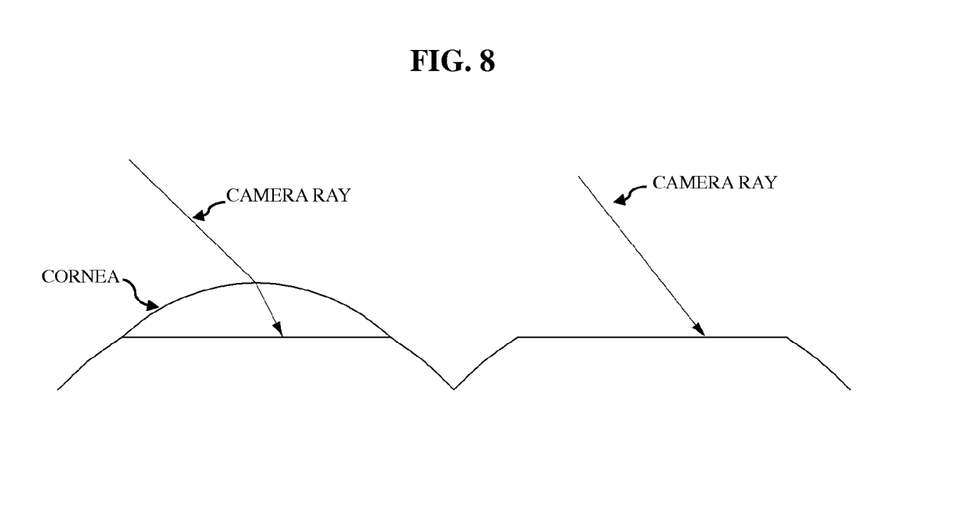
FIG. 8 illustrates a cross-section of an incidence surface of the cornea where a camera ray is refracted.
Figure 9:
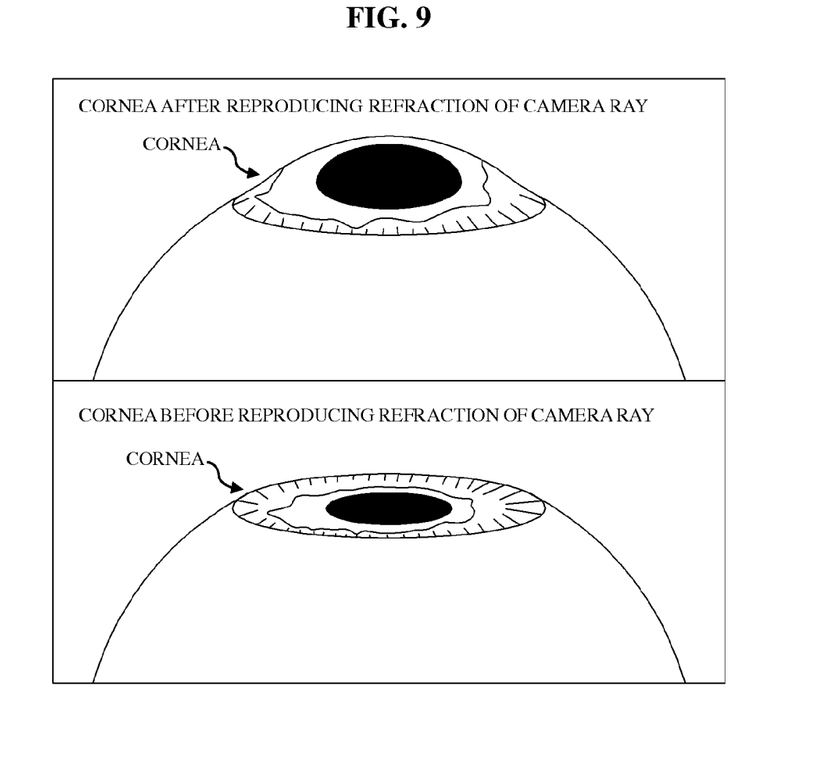
FIG. 9 illustrates results before and after reproducing a refraction of a camera ray on the cornea according to example embodiments.

FIG. 8 illustrates a cross-section of an incidence surface of the cornea where a camera ray is refracted, and FIG. 9 illustrates results before and after reproducing a refraction of a camera ray on the cornea according to example embodiments.

Figure 10:
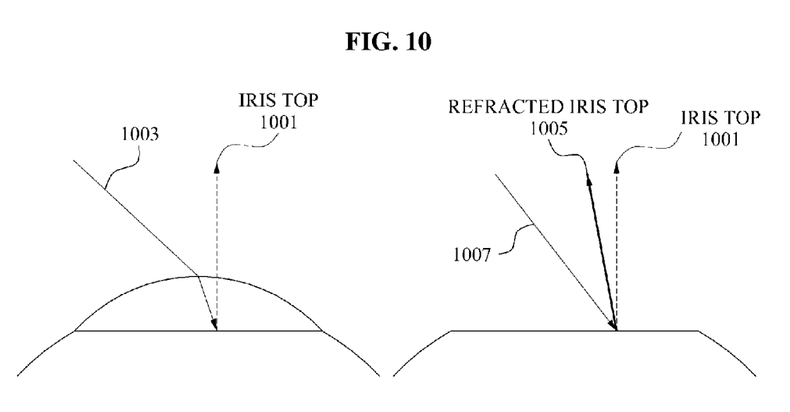
FIG. 10 illustrates a cross-section of an incidence surface of the cornea where a light ray is refracted.
Figure 11:
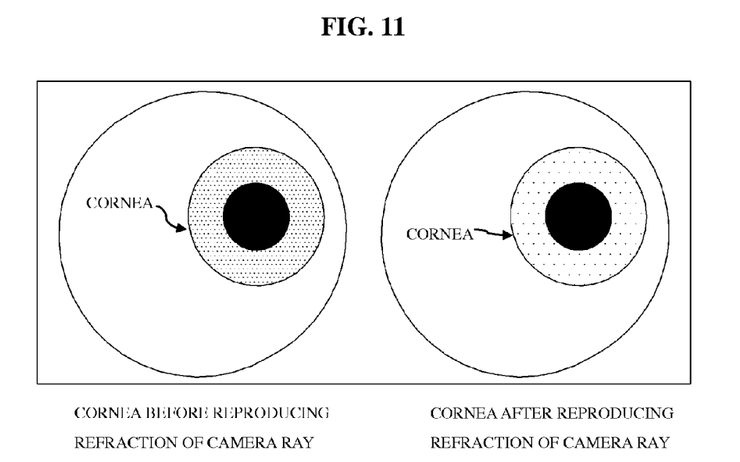
FIG. 11 illustrates results before and after reproducing a refraction of a light ray on the cornea according to example embodiments.

FIG. 10 illustrates a cross-section of an incidence surface of the cornea where a light ray is refracted, and FIG. 11 illustrates results before and after reproducing a refraction of a light ray on the cornea according to example embodiments.

As described above with reference to FIG. 1, the cornea has '+' refractive index and the refractive index of the cornea is 43D. Accordingly, the cornea configured to have the refractive index by the camera ray and the cornea not configured as above may be The cornea rendering unit 253 may render a curved surface portion of the cornea using only the refractive index of light instead of using a geometry of the cornea. The cornea may include a transparent material. The refractive index of the camera ray and the refractive index of light ray may be different from each other with respect to the cornea. Accordingly, the cornea rendering unit 253 may render the cornea by applying the refractive index of each of the camera ray and the light ray with respect to the cornea.

Figure 12:
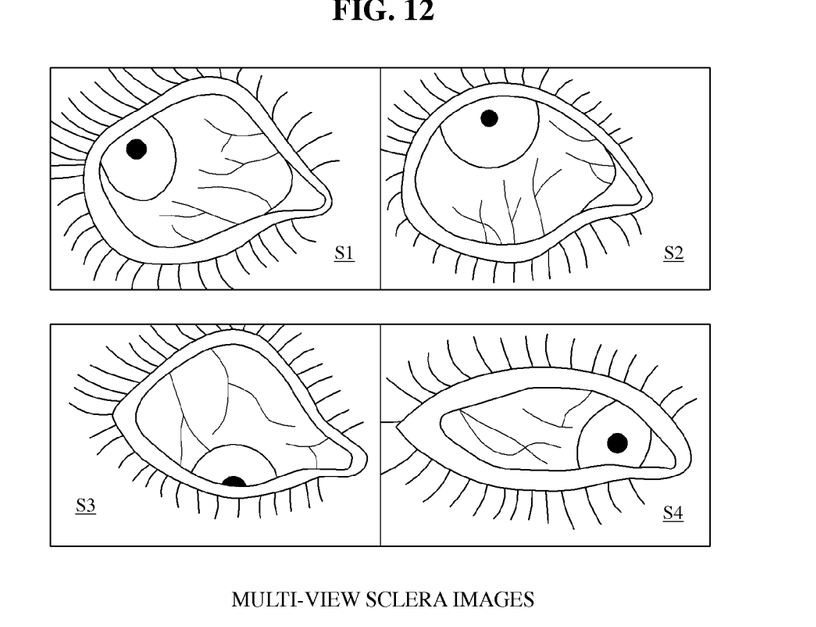
FIG. 12 illustrates images to describe a method of capturing multi-view images with respect to the sclera of a target object to generate a sclera map according to example embodiments.
Figure 13:
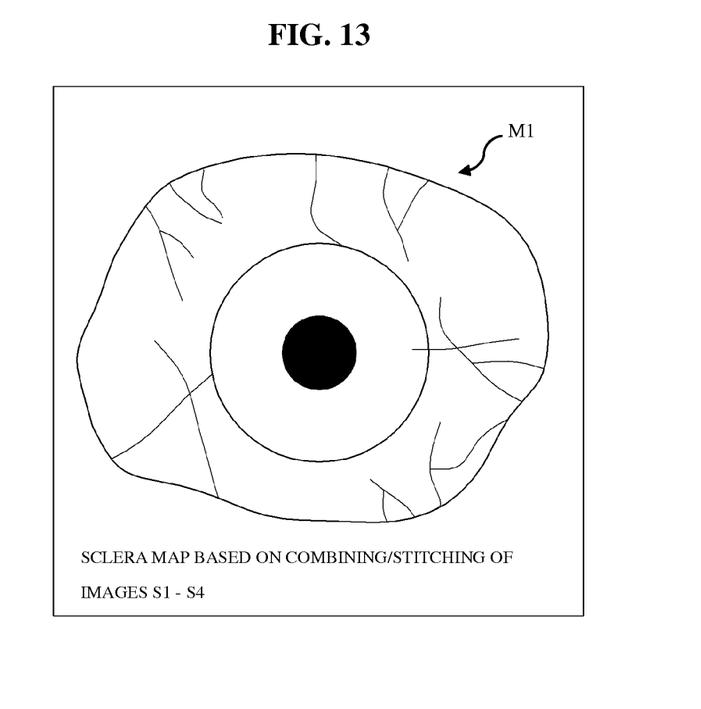
FIG. 13 illustrates the sclera map generated using the multi-view images of FIG. 12.

FIG. 12 illustrates images to describe a method of capturing multi-view images with respect to the sclera of a target object to generate a sclera map according to example embodiments, and FIG. 13 illustrates the sclera map generated using the multi-view images of FIG. 12.

The sclera corresponds to the white of the eyeball and has a translucent material that light is partially transmitted to and reflected from. Accordingly, the sclera may be rendered using a subsurface scattering scheme capable of reproducing the above material property.

The subsurface scattering scheme may correspond to the effect of internally reflecting light having passed the surface to thereby change a color. For example, when the light is illustrated from the opposite side of an ear portion of a human body, the subsurface scattering scheme may reproduce the geometry of the sclera in which a color of skin tissue is used and thereby the sclera appears red.

The sclera rendering unit 254 may capture multi-view images S1-S4 photographed at a plurality of directions of the sclera as shown in FIG. 12. The sclera rendering unit 254 may generate a single sclera map M1 by stitching or combining the captured multi-view images S1-S4 as shown in FIG. 13. The sclera map M1 may be a texture map.

Figure 14:
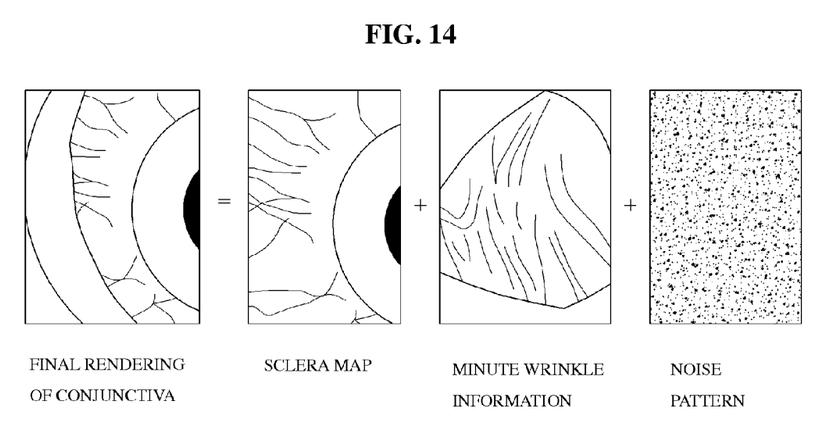
FIG. 14 illustrates wrinkles within a conjunctiva according to example embodiments.

FIG. 14 illustrates wrinkles within a conjunctiva according to example embodiments. Referring to FIG. 14, when closely observing a transparent film thinly covering above the sclera of the eyeball, the minute wrinkles of the conjunctiva may be observed. In addition, a bumpiness of the transparent film may vary due to blood vessels on the surface of the sclera.

Accordingly, as shown in FIG. 14, the bumpiness appearing on the conjunctiva may be reproduced based on minute blood vessels reproduced on the sclera map, minute wrinkles within the conjunctiva, and a noise pattern. The minute blood vessels reproduced on the sclera map may be obtained from information associated with the sclera map generated by the sclera rendering unit 254. Information associated with the minute wrinkles within the conjunctiva may be obtained based on medical information obtained using a fluorescent material with respect to an eyeball of a target object.

Accordingly, the conjunctiva with the reproduced wrinkles, that is, a final rendering result generated by the conjunctiva rendering unit 255 as shown in a leftmost image of FIG. 14 may be generated based on the sclera map as shown in a second image from the left, information associated with the minute wrinkles as shown in a third image from the left, and the noise pattern as shown in a rightmost image.

Figure 15:
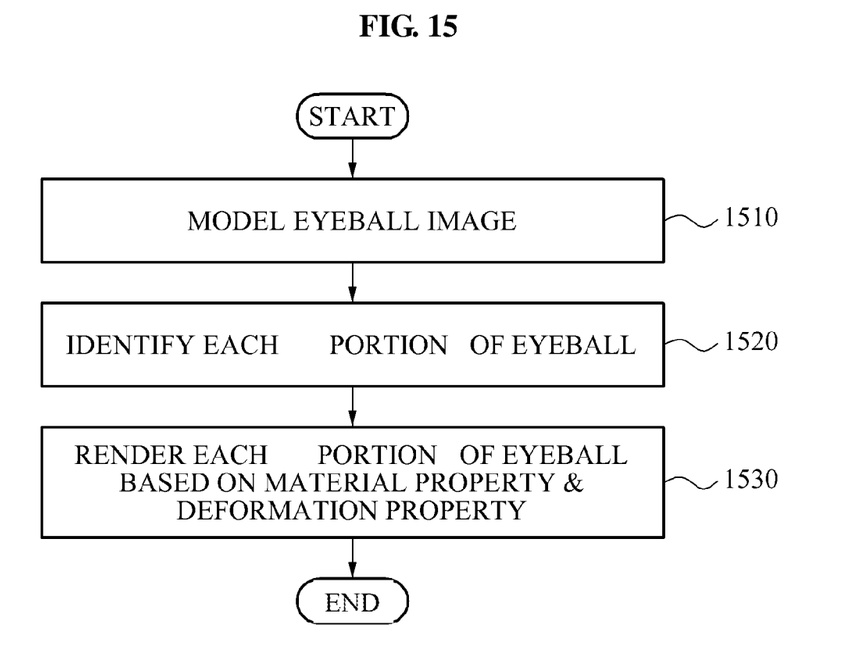
FIG. 15 illustrates a method of realistically reproducing an eyeball according to example embodiments.

FIG. 15 illustrates a method of realistically reproducing an eyeball according to example embodiments.

Referring to FIG. 15, in operation 1510, an apparatus for realistically reproducing the eyeball (hereinafter, reproduction apparatus) may model, to a planar eyeball image, the eyeball including a cornea, a sclera, and an iris.

The reproduction apparatus may identify, from the eyeball image, portions corresponding to the cornea, the sclera, the iris, a pupil, a conjunctiva, and a tear film of the eyeball in operation 1520, and may render each of the portions of the eyeball based on a material property and a deformation property with respect to each of the portions of the eyeball in operation 1530.

Each of the portions corresponding to the cornea, the sclera, the iris, the pupil, the conjunctiva, and the tear film of the eyeball may be rendered as follows:

To realistically reproduce the iris, the reproduction apparatus may restore a texture and a tone constant with respect to the iris, and optically render the iris by employing a multi-layer structure using the texture and the tone constant with respect to the iris.

To realistically reproduce the pupil, the reproduction apparatus may deform a shape of the pupil based on a position of light entering the pupil, a direction of the light, and an amount of the light.

To realistically reproduce the cornea, the reproduction apparatus may render the cornea by applying a refractive index of a camera ray and a refractive index of a light ray with respect to the cornea.

To realistically reproduce the sclera, the reproduction apparatus may generate a sclera map with respect to a sclera of a target object desired to be reproduced, using multi-view images with respect to the sclera of the target object.

To realistically reproduce the minute wrinkles of the conjunctiva, the reproduction apparatus may reproduce the conjunctiva based on minute blood vessels reproduced on the corneal map, information associated with minute wrinkles within the conjunctiva, and a noise pattern.

The reproduction apparatus may reproduce the tear film based on a thickness of the tear film and a specular reflectivity of the sclera.

Further description related to the method of realistically reproducing the constituent portions of the eyeball may refer to the description made above with reference to FIG. 2.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules or units described herein may be executed by a dedicated processor unique to that unit or by a processor common to one or more of the modules. The described methods may be executed on a general purpose computer or processor or may be executed on a particular machine such as the apparatus for realistically reproducing an eyeball described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of realistically reproducing an eyeball, the method comprising:
   using a processor to model the eyeball, and to form a planar eyeball image;
   identifying portions of the eyeball from the planar eyeball image, including an iris and a pupil, wherein each portion has a material property and a deformation property;
   rendering each portion differently from the other portions, based on at least one of the material property and the deformation property associated with each respective portion of the eyeball, wherein the rendering comprises
      rendering the iris by performing un-refraction with respect to a refraction-applied image of the iris to restore a texture of the iris and a tone constant of melanin in the iris, and applying the texture of the iris and the tone constant of melanin in the iris to a multi-layer structure of the iris, the multi-layer structure including an ABL, a stroma, and an IPE, and
      rendering the pupil by deforming a size of the pupil based on a difference between a vector normal to a surface of the pupil and an incident angle of light entering the surface of the pupil, and reproducing a reflecting portion of the pupil based on a position of the light, a direction of the light, and an amount of the light; and
   storing or displaying at least one of the rendered portions.

2. The method of claim 1, wherein the identified portions of the eyeball further comprise a cornea, a sclera, a conjunctiva, and a tear film.

3. The method of claim 1, wherein the deforming comprises reducing the size of the pupil when the difference between the vector normal to the surface of the pupil and the incident angle of the light on the surface of the pupil is relatively small, and enlarging the size of the pupil when the difference between the vector normal to the surface of the pupil and the incident angle of the light on the surface of the pupil is relatively large.

4. The method of claim 2, wherein the rendering further comprises:
   rendering the cornea by applying a refractive index of a camera ray and a refractive index of a light ray with respect to the cornea.

5. The method of claim 2, wherein the rendering further comprises:
   reproducing the conjunctiva, based on minute blood vessels reproduced on the corneal map, information associated with minute wrinkles within the conjunctiva, and a noise pattern.

6. The method of claim 2, wherein the rendering further comprises:
   reproducing the tear film, based on a thickness of the tear film and a specular reflectivity of the sclera.

7. The method of claim 1, wherein the rendering of the each portion further comprises generating a sclera map of a sclera of the eyeball, by capturing multi-view images of the sclera of the eyeball, and generating the sclera map by stitching together the captured multi-view images.

8. A non-transitory computer-readable medium comprising a program for instructing a computer to perform the method of claim 1.

9. An apparatus for realistically reproducing an eyeball, the apparatus comprising:
   a processor configured to control processor-executable modules, the processor-executable modules comprising
      a modeling module configured to model the eyeball, and to form a planar eyeball image,
      an identification module configured to identify portions of the eyeball, including an iris and a pupil, from the eyeball image, wherein each portion has a material property and a deformation property, and
      a rendering module configured to render each portion differently from the other portions, based on at least one of the material property and the deformation property associated with each respective portion of the eyeball, wherein the rendering module is configured to:

render the iris by performing un-refraction with respect to a refraction-applied image of the iris, to restore a texture of the iris and a tone constant of melanin in the iris, and applying the texture of the iris and the tone constant of melanin in the iris to a multi-layer structure of the iris, the multi-layer structure including an ABL, a stroma, and an IPE, and render the pupil by deforming a size of the pupil based on a difference between a vector normal to a surface of the pupil and an incident angle of light entering the surface of the pupil, and reproducing a reflecting portion of the pupil based on a position of the light, a direction of the light, and an amount of the light; and a database configured to store at least one of the rendered portions.

10. The apparatus of claim 9, wherein the portions of the eyeball identified by the identification module further comprise a cornea, a sclera, a conjunctiva, and a tear film.

11. The apparatus of claim 10, wherein the rendering module is further configured to:
render the cornea by applying a refractive index of a camera ray and a refractive index of a light ray of the cornea.

12. The apparatus of claim 10, wherein the rendering module is further configured to:
reproduce the conjunctiva, based on minute blood vessels reproduced on the corneal map, information associated with minute wrinkles within the conjunctiva, and a noise pattern.

13. The apparatus of claim 10, wherein the rendering module is further configured to:
express the tear film, based on a thickness of the tear film and a specular reflectivity of the sclera.

14. The apparatus of claim 9, wherein the rendering module is further configured to capture multi-view images of a sclera of the eyeball, and generate a sclera map of the sclera of the eyeball by stitching together the captured multi-view images.

15. A method of rendering an eyeball, comprising:
separately rendering, using a processor, each component among components of the eyeball, including an iris and a pupil, in accordance with unique properties of each component, wherein the separate rendering of the each component comprises
rendering the iris by performing un-refraction with respect to a refraction-applied image of the iris to restore a texture of the iris and a tone constant of melanin in the iris, and applying the texture of the iris and the tone constant of melanin in the iris to a multi-layer structure of the iris, the multi-layer structure including an ABL, a stroma, and an IPE, and
rendering the pupil by deforming a size of the pupil based on a difference between a vector normal to a surface of the pupil and an incident angle of light entering the surface of the pupil, and reproducing a reflecting portion of the pupil based on a position of the light, a direction of the light, and an amount of the light; and
storing or displaying at least one of the rendered components.

16. The method of claim 15, wherein the components of the eyeball further comprise the cornea, a sclera, the conjunctiva, and the tear film.

17. The method of claim 16, wherein the separate rendering of each component of the eyeball further comprises:
rendering the cornea, by applying a refractive index of a camera ray and a refractive index of a light ray of the cornea;
generating a sclera map of the sclera, by using multi-view images of the sclera, and by using the multi-view images of the sclera map to generate a single combined image of the sclera;
reproducing the conjunctiva, based on blood vessels reproduced on a corneal map, information associated with wrinkles within the conjunctiva, and a noise pattern; and
reproducing the tear film, based on a thickness of the tear film and a specular reflectivity of the sclera.

18. The method of claim 15, wherein the unique properties of the each respective component comprise at least one of a material property and a deformation property.

19. A non-transitory computer-readable medium comprising a program for instructing a computer to perform the method of claim 15.

20. An apparatus for reproducing an eyeball, the apparatus comprising:
a processor configured to control processor-executable modules, the modules comprising
an identification module configured to identify components of the eyeball, wherein the components of the eyeball comprise an iris and a pupil, and
a rendering module configured to separately render each component of the eyeball in accordance with unique properties of each component, wherein the rendering module is configured to:
render the iris by performing un-refraction with respect to a refraction-applied image of the iris to restore a texture of the iris and a tone constant of melanin in the iris, and applying the texture of the iris and the tone constant of melanin in the iris to a multi-layer structure of the iris, the multi-layer structure including an ABL, a stroma, and an IPE, and
render the pupil by deforming a size of the pupil based on a difference between a vector normal to a surface of the pupil and an incident angle of light entering the surface of the pupil, and reproducing a reflecting portion of the pupil based on a position of the light, a direction of the light, and an amount of the light; and
a database configured to store at least one of the rendered components.

21. The apparatus of claim 20, wherein the components of the eyeball further comprise a cornea, a sclera, a conjunctiva, and a tear film.

22. The apparatus of claim 21, wherein the wherein the rendering module is further configured to:
render the cornea, by applying a refractive index of a camera ray and a refractive index of a light ray of the cornea;
a sclera rendering module configured to generate the sclera map of the sclera, by using the multi-view images of the sclera map to generate a single combined image of the sclera;
reproduce the conjunctiva, based on blood vessels reproduced on a corneal map, information associated with wrinkles within the conjunctiva, and a noise pattern; and
reproduce the tear film, based on a thickness of the tear film and a specular reflectivity of the sclera.

23. The apparatus of claim 20, wherein the unique properties of each respective component comprise at least one of a material property and a deformation property.

* * * * *